(12) United States Patent
Raj

(10) Patent No.: US 7,447,820 B2
(45) Date of Patent: Nov. 4, 2008

(54) RETARGETING OF PLATFORM INTERRUPTS

(75) Inventor: Ashok Raj, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 200 days.

(21) Appl. No.: 11/241,261

(22) Filed: Sep. 30, 2005

(65) Prior Publication Data

US 2007/0079039 A1 Apr. 5, 2007

(51) Int. Cl.
*G06F 13/24* (2006.01)
(52) U.S. Cl. ............................ 710/260; 710/267
(58) Field of Classification Search ......... 710/260–269, 710/48–50
See application file for complete search history.

(56) References Cited

U.S. PATENT DOCUMENTS

| | | | | |
|---|---|---|---|---|
| 6,006,301 A | * | 12/1999 | Tetrick | 710/260 |
| 6,711,643 B2 | * | 3/2004 | Park et al. | 710/260 |
| 6,813,665 B2 | * | 11/2004 | Rankin et al. | 710/260 |
| 6,948,094 B2 | * | 9/2005 | Schultz et al. | 714/15 |
| 6,976,099 B2 | * | 12/2005 | George et al. | 710/36 |
| 2005/0022059 A1 | * | 1/2005 | Wei | 714/36 |

* cited by examiner

*Primary Examiner*—Raymond N Phan
(74) *Attorney, Agent, or Firm*—Schwegman, Lundberg & Woessner, P.A.

(57) ABSTRACT

Systems, methods, and apparatus to retarget platform interrupts in a reconfigurable system. Some embodiments include identifying each processor of a multiprocessor system capable of processing Corrected Platform Error Interrupts, adding each processor capable of processing Corrected Platform Error Interrupts to a list of potential Corrected Platform Error Interrupt targets, and updating an interrupt table with a target processor for an interrupt, wherein the interrupt table is accessible by an interrupt controller to target platform interrupts. Another embodiment includes receiving a request to disable the first processor in a multiprocessor apparatus, determining if the first processor is a Corrected Platform Error Interrupt destination, and determining if the second processor is capable of processing Corrected Platform Error Interrupts. This embodiment also includes reprogramming an interrupt controller to route interrupts to the second processor instead of the first processor and disabling the first processor.

24 Claims, 7 Drawing Sheets

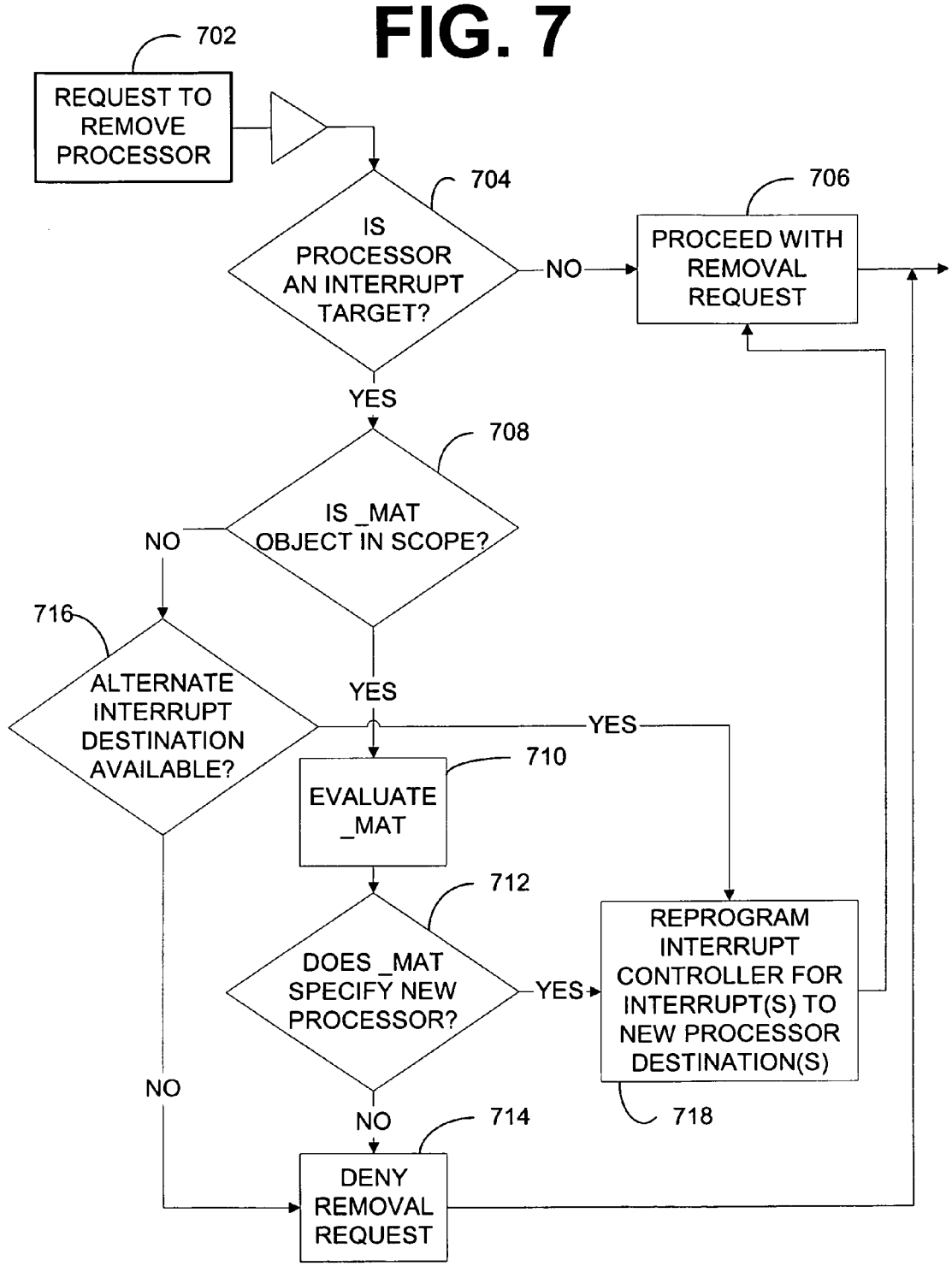

RETARGETING OF PLATFORM INTERRUPTS

TECHNICAL FIELD

The inventive subject mater relates to interrupt processing and, more particularly, a method and apparatus to retarget platform interrupts in a reconfigurable system.

BACKGROUND INFORMATION

Multiprocessor systems are becoming more and more common. Applications of multiprocessor systems include dynamic domain partitioning all the way down to desktop computing. However, this broader use of multiprocessor systems is providing system administration issues. For example, if, while a system is online, a processor needs to be removed or replaced or if capacity needs to be increased or decreased, various issues arise. One such issue is when a processor to be removed or reallocated to a different partition happens to be a platform interrupt target. Removal or reallocation of such a processor that is a platform interrupt target can prevent such interrupts from being processed properly, and potential unwanted system downtime. Thus, although multiprocessor systems provide benefits of increased processing bandwidth, multiprocessor systems are not flexible enough to handle varying demand and system serviceability requirements.

BRIEF DESCRIPTION OF THE DRAWINGS

FIG. 7 is a flow diagram of another method to process a request to remove a processor according to an example embodiment of the inventive subject matter.

DETAILED DESCRIPTION

Figure 1:
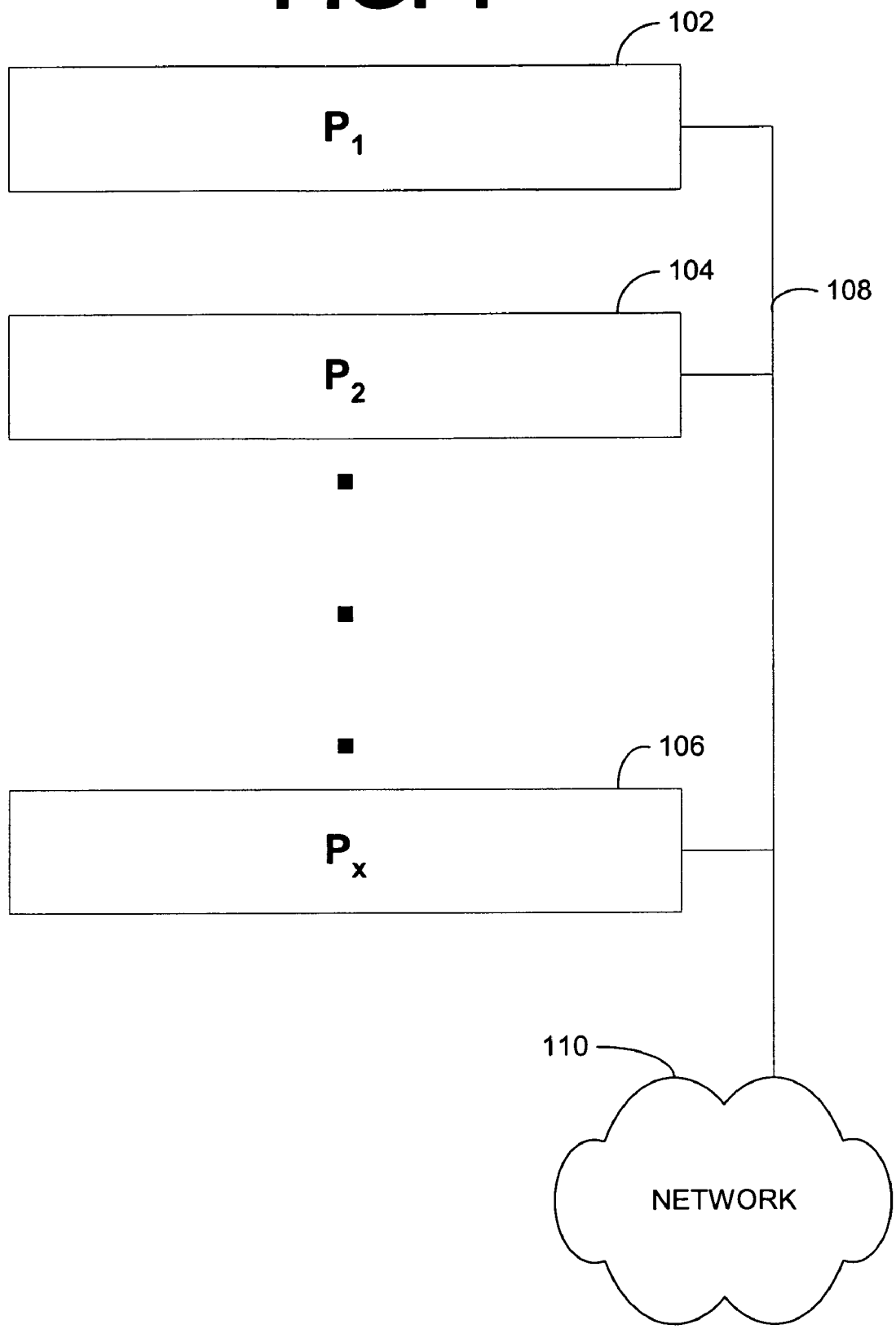
FIG. 1 is a schematic of a system according to an example embodiment of the inventive subject matter.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions encoded in a computer readable media. Further, such functions correspond to modules, which are software, hardware, firmware, or any combination thereof. Multiple functions are performed in one or more modules as desired, and the embodiments described are merely examples. The software is executed on a digital signal processor, application-specific integrated circuit, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

In many situations, a processor may need to be offlined. For example, an operating system may decide to offline a processor due to monitoring an error rate on a central processing unit, also known as operating system initiated central processing unit removal. Further, the platform management software, such as a partition manager, may also decide to offline a processor for reasons to support dynamic partitioning or capacity management. Additionally, a system administrator may decide to offline a central processing unit. However, if a processor is to be offlined, there are several considerations before the action can be taken.

In a live system, input/output devices actively generate interrupts to the central processing units in the system. When an input/output device asserts an interrupt, it is delivered to a single processor, even when there are multiple central processing units in the system. However, if the operating system wants to remove a central processing unit dynamically, it must reprogram the interrupt controller (i.e., Input/Output Advanced Programmable Interrupt Controller ("I/O APIC") redirection table entry or Message Signaled Interrupt address fields in PCI configuration header of the input/output device) such that the central processing unit being removed is no longer a possible interrupt destination for each interrupt source in the platform.

Many systems have reliability, availability, and serviceability ("RAS") features such as error detection and correction of single bit errors. When such errors are being corrected, the platform firmware gets involved in notifying the operating system by generating an interrupt, similar to how an external input/output device such as a SCSI adapter, or Ethernet adapter would function. These platform interrupts also need to change destination central processing unit information when the interrupt target central processing unit is being removed. However, one difficulty is that on some platforms, the error registers are not readable by just any random central processing unit in a multiprocessor system. Instead, the error registers are accessible to just one or to a subset of central processing units close to the error registers.

The various embodiments illustrated in FIG. 1-FIG. 7 and described herein provide mechanisms for an operating system (OS) and the platform firmware to safely reprogram the interrupt destination for platform errors before a central processing unit is dynamically offlined while at the same time providing flexibility to the platform firmware by providing an alternate CPU to the OS.

FIG. 1 is a schematic of a system 100 according to an example embodiment of the inventive subject matter. The system 100 is an example multiprocessor system having processors $P_1$, $P_2$, and $P_x$ each in a server 102, 104, and 106, respectively. This embodiment includes three processors $P_1$, $P_2$, and $P_x$, but other embodiments can include two processors or four or more processors. Yet other embodiments include multiple processors in one or more of the servers 102, 104, and 106.

As illustrated, the servers 102, 104, and 106 include processors $P_1$, $P_2$, and $P_x$ that are capable of working together. In some embodiments, the servers are blades within a rack-mount system. However, in other embodiments, the processors $P_1$, $P_2$, and $P_x$ can be processors within an individual server or personal computing device. In yet further embodiments, the processors $P_1$, $P_2$, and $P_x$ can be processors within a single computing system. An example of a server 102, 104, and 106 including a processor, such as processor $P_1$, $P_2$, or $P_x$, is illustrated and described with respect to FIG. 2.

The processors $P_1$, $P_2$, and $P_x$ within the servers 102, 104, and 106 are operatively interconnected via a connection 108. The connection 108 can include a bus, a network 110 connection, or other connection type enabling the processors $P_1$, $P_2$, and $P_x$ and/or servers 102, 104, and 106 to communicate with one another.

In some embodiments, the servers 102, 104, and 106 are connected to a network 110. The network 110, in some embodiments, includes one or more of a local-area network, a wide-area network, system area network, a virtual private network, and a global network, such as the Internet. In some such embodiments, the servers 102, 104, and 106 receive processing requests, data requests, and other communications from the network 110.

Figure 2:
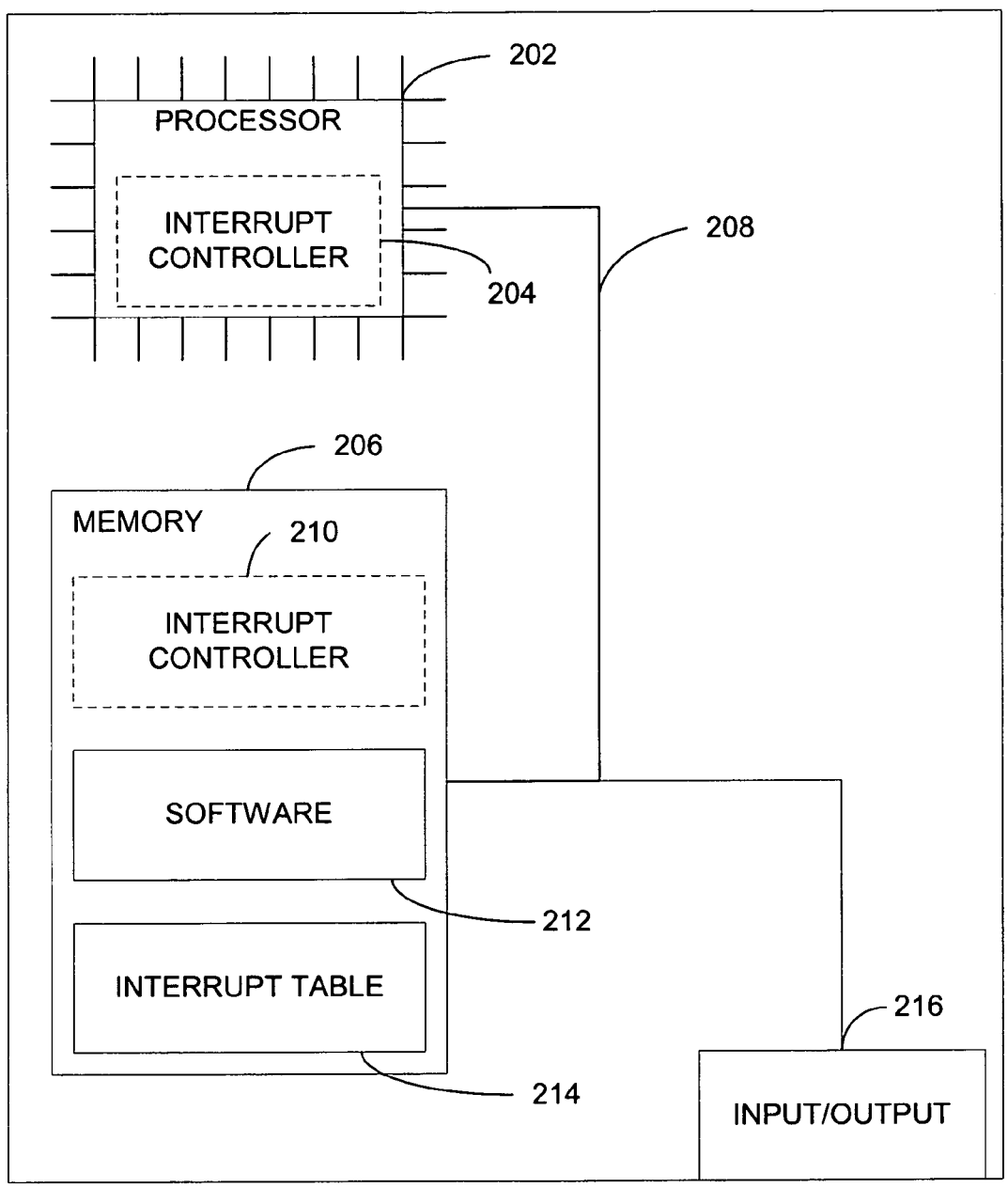
FIG. 2 is a schematic of a system according to an example embodiment of the inventive subject matter.

FIG. 2 is a schematic of a system 200 according to an example embodiment of the inventive subject matter. The system 200 illustrates an example of a server, such as a server 102, 104, or 106 as illustrated in FIG. 1. The system 200 includes a processor 202 operatively interconnected via a bus 208 to a memory 206 and an input/output device 216.

In some embodiments, the processor 202 is a general purpose central processing unit. An example processor 202 is a processor selected from the Intel® Itanium® processor family. Another example processor 202 is a processor selected form the Intel® Pentium® processor family. Yet further examples include digital signal processors, application-specific integrated circuits, microprocessors, reduced instruction set computer processors, vector processors, and other types of processors that operate on computing systems.

In some embodiments, the processor 202 includes an interrupt controller in processor 202 firmware. In some embodiments, the interrupt controller is an Advanced Programmable Interrupt Controller ("APIC") in accordance with the Advanced Configuration and Power Interface Specification. The APIC architecture supports multiprocessor interrupt management (with symmetric interrupt distribution across all processors), multiple I/O subsystem support, 8259A compatibility, and interprocessor interrupt support. The architecture consists of local APICs commonly attached directly to processors and I/O APICs commonly in chip sets. In some such embodiments, the interrupt controller 204 includes one or more of an Input/Output Advanced Programmable Interrupt Controller ("I/O APIC") and a Input/Output Streamlined Advanced Programmable Interrupt Controller ("I/O SAPIC") that routes interrupts from devices to the processor's 202 local Advanced Programmable Interrupt Controller.

The input/output device 216 represents one or more devices to receive input and provide output. For example, the input/output device includes one or more of a wired or wireless network interface card, a high-speed interconnect between the system 200 and other systems operating within a domain, or other input/output device.

The memory 206 represents one or more mechanisms to store data. For example, the memory 206, in various embodiments, includes one or more of a random access memory (RAM), magnetic disk storage media, optical storage media, flash memory devices, and other volatile and non-volatile machine-readable media. In other embodiments, the memory 206 includes any appropriate type of storage or memory 206. Although only one memory 206 is shown, multiple memories 206 of various types and multiple types can be present.

The memory 206 includes an interrupt table 214, in some embodiments, is a Multiple APIC Description Table ("MADT") in accordance with the Advanced Configuration and Power Interface Specification. In other embodiments, the interrupt table 214 includes a row for one or more interrupt types, which can include a global system interrupt, and a representation of a processor to which interrupts of the type are to be directed. In some such embodiments, the processor representation includes a primary processor interrupt destination;, and a secondary processor destination. In some embodiments, the interrupt table 214, or a portion thereof, is stored within a memory device internal to the processor 202.

The memory 206 also includes software 212. The software 206 is operable on the processor to perform various functions and methods as described herein. Some embodiments also include a software interrupt controller 210, similar to the processor 202 firmware interrupt controller 204.

When offlining a processor, the operating system needs to know which processors of a multiprocessor system provide a safe destination for interrupts, such as Corrected Platform Error Interrupts. The Advanced Configuration and Power Interface Specification ("ACPI") provides a mechanism for the operating system to be aware of this information via an entry in a Multiple Advanced Programmable Interrupt Controller Table ("MADT") provided at boot time. There is typically just one entry per interrupt type and each entry provides information such as a type of interrupt and a target processor identifier to route interrupts of that type to. However, such tables are not flexible enough to allow for a processor that is an interrupt destination to be removed without detrimental system effects. Further, some embodiments of the inventive subject matter need to know which processors are capable of processing interrupts.

Some systems, such as systems enabled to comply with the Advanced Configuration and Power Interface Specification, include descriptions of some or all possible system objects. Each object is described in the Advanced Configuration and Power Interface Specification namespace along with a method that can be dynamically evaluated by the operating system using platform software. In some embodiments that support dynamic operating system initiated removal of a central processing unit, the platform interrupt source can be described under each processor object that is a potential target of platform interrupts. The "Multiple APIC Table Entry" (MAT) is one such object that can be dynamically evaluated. Typically when describing processor entries, platforms supporting the Advanced Configuration and Power Interface Specification only describe the Local APIC and Local APIC Non-maskable Interrupt source structures. Existing Operating Systems would ignore any other type of entry in the processor object scope in the Advanced Configuration and Power Interface Specification name space.

Figure 3:
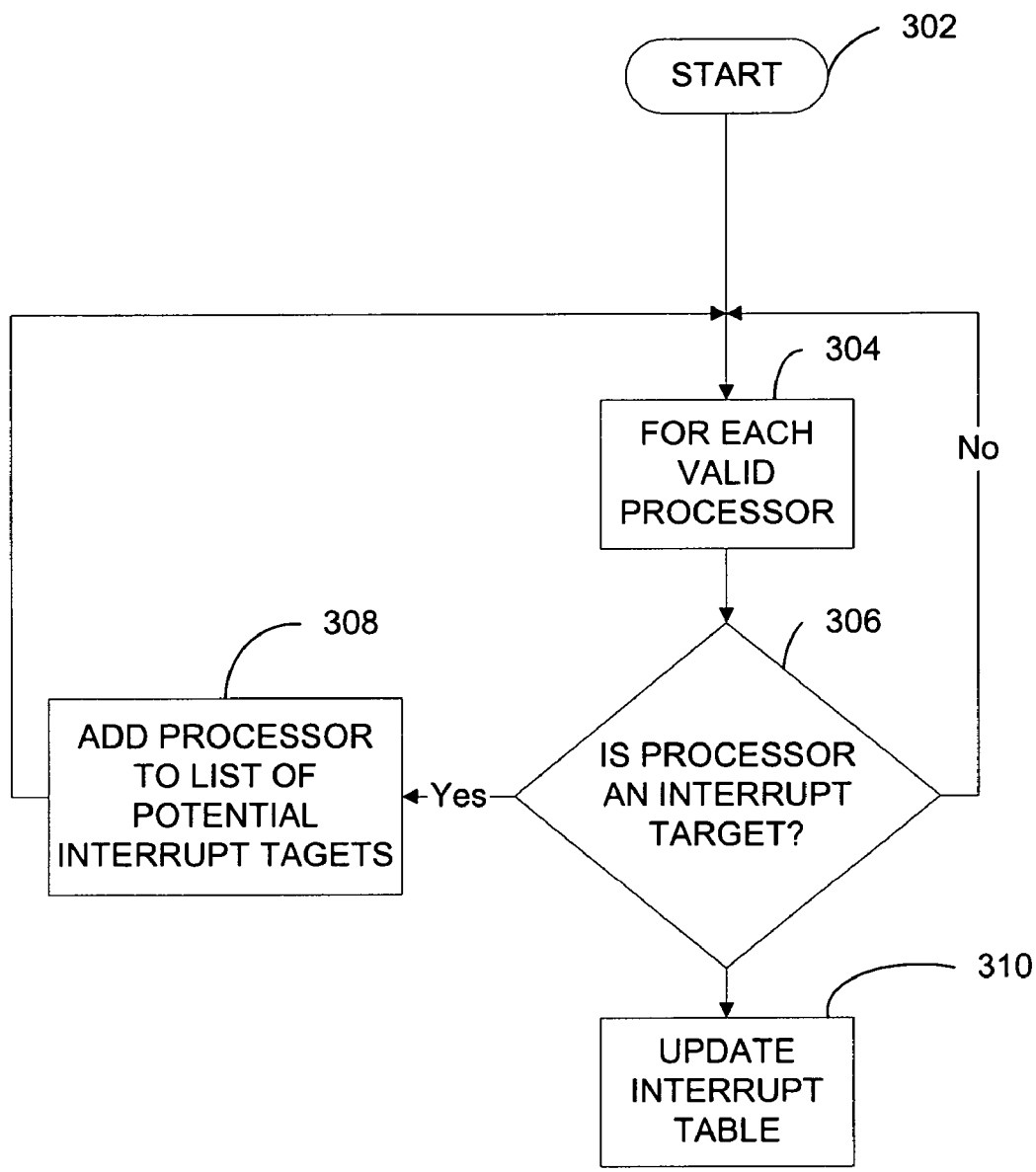
FIG. 3 is a flow diagram of a method to update an interrupt table according to an embodiment of the inventive subject matter.

To provide flexibility to various embodiments to identify current and possible interrupt destination processors, information is added to the Platform Interrupt Source structures as well to the processor scope. In such embodiments, the processors are evaluated at system boot to determine if they capable of processing interrupts. The method illustrated in FIG. 3 provides an example method of evaluating processors. This provides systems greater flexibility when determining a target processor for interrupts and reprogramming interrupt destinations.

FIG. 3 is a flow diagram of a method 300 to update an interrupt table according to an embodiment of the inventive subject matter. The method 300 is executed on a computing device, such as a system 200 of FIG. 2. In some embodiments, the method 300 is executed at the time a computing device is booted in order to update an interrupt table with available interrupt destinations. In other embodiments, the method 300 is executed on demand, such as when directed by a operating system upon the occurrence of an event. One objective of this method 300, and others described herein, is to identify actual and possible interrupt destinations to allow safe modification of interrupt destinations programmed in an interrupt controller.

The method 300 starts 302 and executes in a looping manner for each valid processor 304. Processors, in some embodiments, are identified by the method 300 through the Advanced Configuration and Power Interface Specification namespace. Each object such as a processor is described along with a method that can be dynamically evaluated by an operating system using platform software. The method determines if a processor is an interrupt target 306, such as a target for Corrected Platform Error Interrupts ("CPEI"). If the processor is an interrupt target, the processor is added to a list of potential interrupt targets 308. The next processor is then evaluated to determine if it is also an interrupt target 306. If a processor is not an interrupt target, the next processor is evaluated. After all of the processors have been evaluated, an interrupt table is updated 310 to identify the interrupt target processors. In some embodiments, the interrupt table is stored in a main memory of the computing device executing the method 300.

In some embodiments, determining if a processor is an interrupt target 306 also includes identifying if the processor is capable of processing interrupts. In such embodiments, updating the interrupt table 310 includes updating the interrupt table 310 to include an indication of the interrupt processing abilities of each processor.

Also, some embodiments include updating the interrupt table 310 to include a primary and secondary target processor for each interrupt. In such embodiments, when an interrupt is received and the primary target processor needs to be removed, the processor can be removed so long as the secondary target processor is online, and vice versa.

Updating the interrupt table 310, in some embodiments, includes adding information to the interrupt. In these and other embodiments, updating the interrupt table 310 includes one or more of modifying, inserting, and deleting interrupt table entries.

In some embodiments, the interrupt table is an Input/Output Advanced Programmable Interrupt Controller table. In some embodiments, information associated with a processor that is identified by the method 300 as an actual or possible interrupt target is modified, or added to, to indicate the actual or possible interrupt target.

Subsequent to the identification of actual and possible interrupt destination targets, a request to remove a processor is received. This request can come from numerous sources including an operating system, a partition manager, a system administrator, or other source. In the event that the processor to be removed is an interrupt destination, the interrupts targeted to that processor must be rerouted to ensure the system remains capable of receiving critical platform error interrupts. FIGS. 4-7 provide methods of handling such removal requests.

Figure 4:
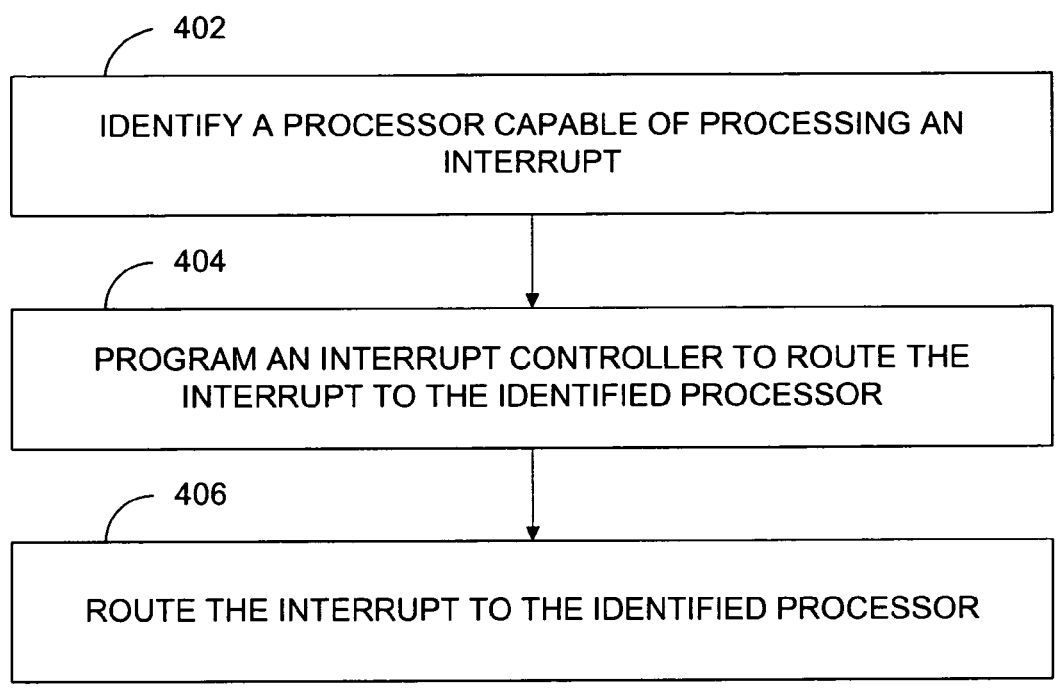
FIG. 4 is a flow diagram of a method to program an interrupt controller and route interrupts according to an example embodiment of the; inventive subject matter.

FIG. 4 is a flow diagram of a method 400 to program an interrupt controller and route interrupts according to an example embodiment of the inventive subject matter. The method 400 includes identifying a processor capable of processing an interrupt 402 and programming an interrupt controller to route the interrupt to the identifies processor 404. The method 400 further includes routing the interrupt to the identified processor 406.

Identifying a processor capable of processing an interrupt 402, in some embodiments includes evaluating an interrupt table, such as the interrupt table updated 310 in FIG. 3. In other embodiments, the interrupt table is identified dynamically by evaluating processor information available from an operating system, a processor platform, or otherwise, such as through the Advanced Configuration and Power Interface Specification namespace.

Programming an interrupt controller to route the interrupt to the identified processor include modifying an entry in an interrupt table that identifies a target processor for the interrupt. In some embodiments, the interrupt controller that is modified is an Input/Output Advanced Programmable Interrupt Controller. In some such embodiments, the Advanced Programmable Interrupt Controller is a Input/Output Streamlined Advanced Programmable Interrupt Controller.

Figure 5:
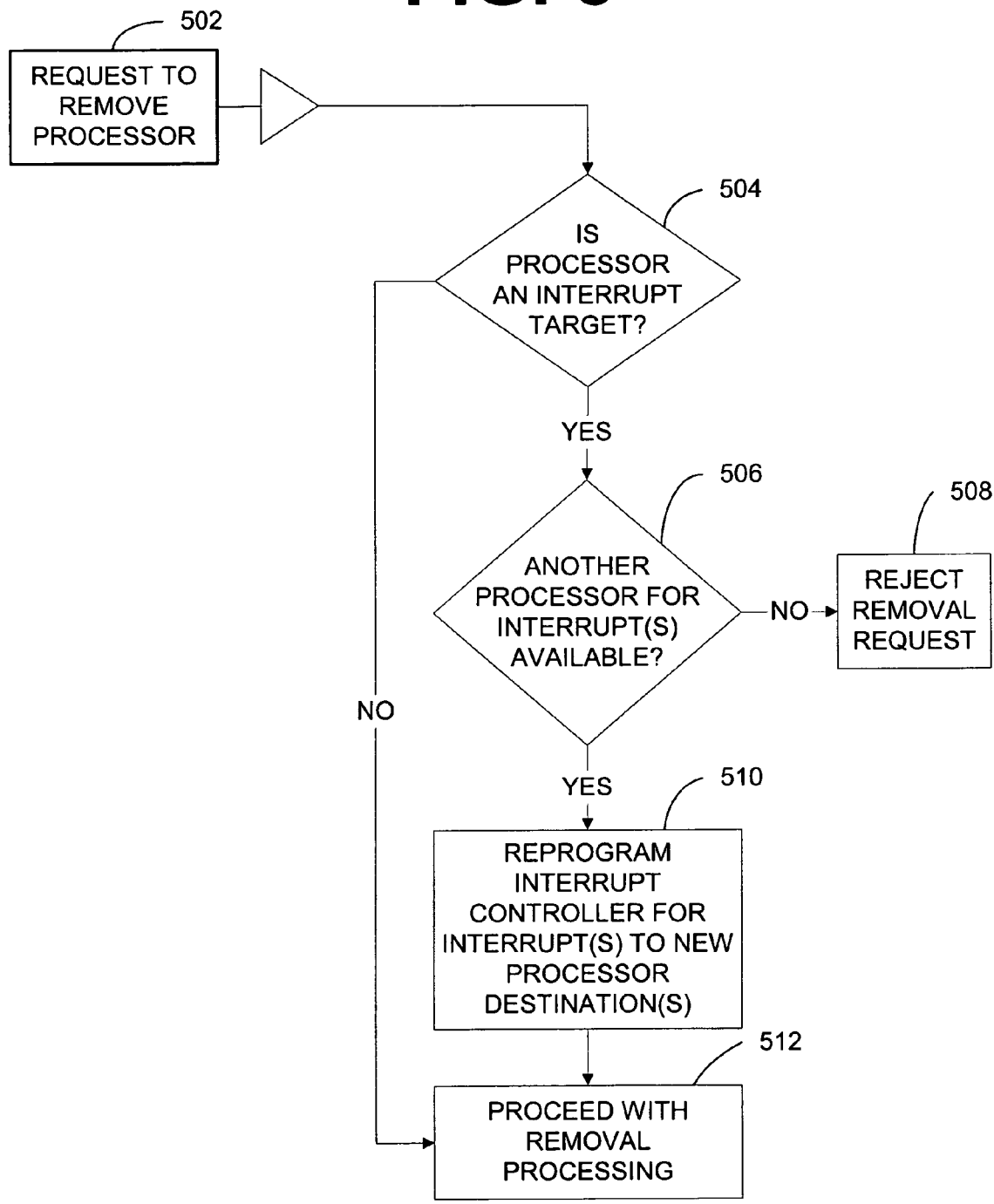
FIG. 5 is a flow diagram of a method to process a request to remove a processor according to an example embodiment of the inventive subject matter.

FIG. 5 is a flow diagram of a method 500 to process a request to remove a processor according to an example embodiment of the inventive subject matter. The method 500 includes receiving a request to remove a processor 502 and determining if the processor to be removed is an interrupt target 504, such as a Corrected Platform Error Interrupt target. If the processor is not an interrupt target, the method 500 proceeds with processor removal processing 512. If the processor is an interrupt target, the method 500 determines if another processor for the corrected platform error interrupt is available 506. This occurs, in some embodiments, by searching through the interrupt table updated in FIG. 3. If there is not another processor available to handle the interrupts, the removal request is rejected 508. If there is another processor available to handle the interrupts, the method 500 reprograms the interrupt controller for each interrupt to the new processor destination, or destinations, 510. The method 500 proceeds with processor removal processing 512, such as shutting the processor down for physical removal of the processor or disabling the processor to prepare the processor for use in another partition.

In some embodiments, after the removal processing 512 is complete, a message is generated by the method 500 indicating the processor, for which the removal request was received, has been disabled. In some such embodiments, the message is sent to a system administrator. In other embodiments, the message is sent to a system tracking service level agreement or objective compliance. In some embodiments, the message is sent via email. In other embodiments, the message is sent via pager, text messaging, or other means suitable of conveying the message to a system administrator or other interested person or machine.

Figure 6:
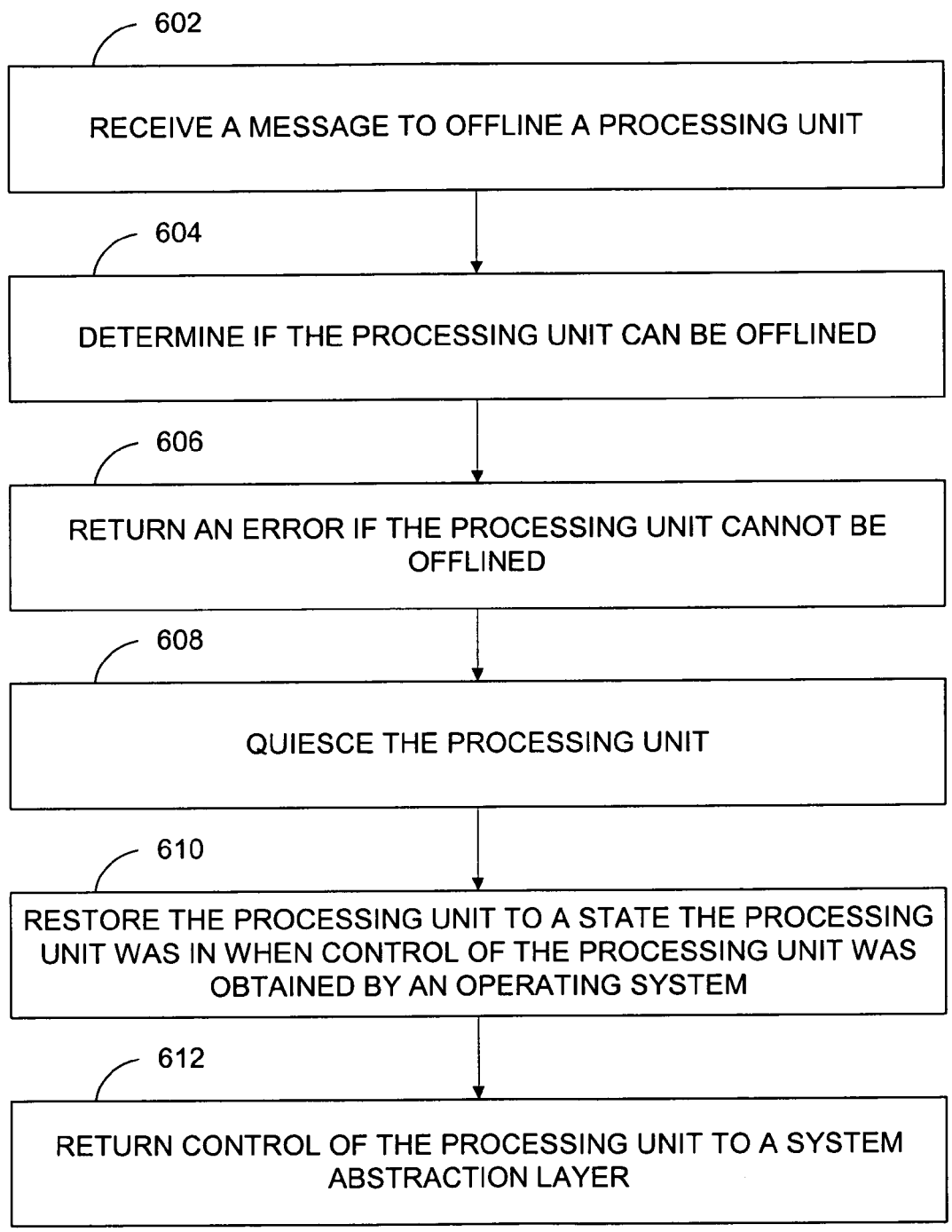
FIG. 6 is a flow diagram of a method to offline a processing unit according to an example embodiment of the inventive subject matter.

FIG. 6 is a flow diagram of a method 600 to offline a processing unit according to an example embodiment of the inventive subject matter. The method 600 includes receiving a message to offline a processing unit 602. In some embodiments, the processing unit is a processor or a single core of a multicore processor. In other embodiments, the processing unit to be offlined includes the system, such as a server, in which the processor resides.

After the message offline the processing unit is received 602, the method 600 determines if the processing unit can be offlined 604. This determination is made, in some embodiments by identifying the processing unit is a platform interrupt target and if there is another processing unit capable of filling the role as the interrupt target. If there is no alternate processor identified the target processor cannot be offlined, the method 600 returns an error 606 and stops execution. If the processor can be offlined, the method quiesces the processing unit 608.

After quiescing the processing unit 610, the method 600 restores the processing unit to a state the processing unit was in when control of the processing unit was obtained by the operating system 610 of the system executing the method 600. Control of the processing unit is then returned to a system abstraction layer 612, such as that of a processor of an Intel® Itanium® processor. Returning control of the processing unit to a system abstraction layer places the processing unit in a state where the processing unit can be removed from a system.

FIG. 7 is a flow diagram of another method 700 to process a request to remove a processor according to an example embodiment of the inventive subject matter. This embodiment is intended for execution on a system that complies with the Advanced Configuration and Power Interface Specification. The method 700 includes receiving a request to remove a processor 702 and determining if the processor is an interrupt target 704. If the processor is not an interrupt target, the method 700 proceeds with the removal request 706.

If the processor is an interrupt target, the method 700 determines if the _MAT object is in scope 708 (_MAT is a Multiple Advanced Programmable Interrupt Controller Table platform call that can return a buffer containing Platform Interrupt Source Structure entries). If not, the method 700 determines if an alternate interrupt destination is available 716, such as a secondary interrupt target discussed above with regard to FIG. 3.

If there is not an alternate interrupt destination available, the method 700 denies the removal request 714. If there is an alternate interrupt destination available, the method 700 reprograms the interrupt controller to the new processor destination 718 and proceeds with the removal request 706.

However, if the method 700 determines the _MAT object is in scope 708, the method evaluates the _MAT object 710. Evaluating the _MAT object 710 causes the platform to return data from which a different processor, if available in a system executing the method 700, to route the interrupts to.

The method 700 then considers the _MAT return to determine if a new processor is specified 712. If the return does not specify a new processor, the removal request is denied 714. If the return does specify a new processor, the method 700 reprograms the interrupt controller to the new processor destination 718 and proceeds with the removal request 706.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. An apparatus comprising:
   a memory coupled to a bus;
   a plurality of processors including a first processor and a second processor, wherein both the first and second processors are coupled to the bus; and
   software stored in the memory and executable by at least one of the first processor and second processor to modify a Corrected Platform Error Interrupt destination, wherein the software executes to result in the apparatus:
     receiving a request to disable the first processor in a multiprocessor apparatus;
     determining if the first processor is a Corrected Platform Error Interrupt destination;
     determining if the second processor is capable of processing Corrected Platform Error Interrupts;
     reprogramming an interrupt controller to route interrupts to the second processor instead of the first processor; and
     disabling the first processor.

2. The apparatus of claim 1, wherein the software further executes to result in the apparatus:
   disabling the first processor if the first processor is not a Corrected Platform Error Interrupt destination.

3. The apparatus of claim 1, wherein the software further executes to result in the apparatus:
   denying the request to disable the first processor if the second processor is not capable of processing Corrected Platform Error Interrupts.

4. The apparatus of claim 1, wherein determining if the second processor is capable of processing Corrected Platform Error Interrupts includes identifying the second processor, wherein the software identifies the second processor by:
   evaluating processors of the plurality of processors to determine if one or more other processors other than the first processor are capable of processing Corrected Platform Error Interrupts the first processor receives; and
   outputting either an identified processor or an indication that another processor is not available to process the Corrected Platform Error Interrupts the first processor receives.

5. The apparatus of claim 1, wherein the software, when determining if a second processor of the multiprocessor apparatus is capable of processing Corrected Platform Error Interrupts, includes:
   determining if the secondary processor is defined in an interrupt table accessible by an interrupt controller.

6. The apparatus of claim 1, wherein after the first processor is disabled by the software, the first processor is in a state where it can be physically removed from the apparatus.

7. The apparatus of claim 1, wherein the interrupt controller is an Input/Output Advanced Programmable Interrupt Controller ("I/O APIC").

8. The apparatus of claim 1, wherein the interrupt controller is an Input/Output Streamlined Advanced Programmable Interrupt Controller ("I/O SAPIC").

9. The apparatus of claim 1, wherein the plurality of processors includes three or more processors.

10. The apparatus of claim 1, wherein reprogramming the interrupt controller includes modifying an Input/Output Advanced Programmable Interrupt Controller ("I/O APIC") redirection table entry.

11. The apparatus of claim 1, wherein the software further executes to result in the apparatus:
   generating a message indicating the first processor has been disabled.

12. The apparatus of claim 11, wherein the software further executes to result in the apparatus:
   sending the message to a system administrator.

13. A method comprising:
   receiving a request to disable a first processor in a multiprocessor apparatus;
   determining if the first processor is a Corrected Platform Error Interrupt destination;
   determining if a second processor is capable of processing Corrected Platform Error Interrupts;
   reprogramming an interrupt controller to route interrupts to the second processor instead of the first processor; and
   disabling the first processor.

14. The method of claim 13, further comprising:
   disabling the first processor if the first processor is not a Corrected Platform Error Interrupt destination.

15. The method of claim 13, further comprising:
   denying the request to disable the first processor if the second processor is not capable of processing Corrected Platform Error Interrupts.

16. The method of claim 13, wherein determining if the second processor is capable of processing Corrected Platform Error Interrupts includes identifying the second processor, wherein identifying the second processor includes:
   evaluating processors of the plurality of processors to determine if one or more other processors other than the first processor are capable of processing Corrected Platform Error Interrupts the first processor receives; and
   outputting either an identified processor or an indication that another processor is not available to process the Corrected Platform Error Interrupts the first processor receives.

17. The method of claim 13, wherein determining if a second processor of the multiprocessor apparatus is capable of processing Corrected Platform Error Interrupts includes:
   determining if the secondary processor is defined in an interrupt table accessible by an interrupt controller.

18. The method of claim 13, wherein after the first processor is disabled, the first processor is in a state where it can be physically removed from the apparatus.

19. The method of claim 13, wherein the interrupt controller is an Input/Output Advanced Programmable Interrupt Controller ("I/O APIC").

20. The method of claim 13, wherein the interrupt controller is an Input/Output Streamlined Advanced Programmable Interrupt Controller ("I/O SAPIC").

21. The method of claim 13, wherein the plurality of processors includes three or more processors.

22. The method of claim 13, wherein reprogramming the interrupt controller includes modifying an Input/Output Advanced Programmable Interrupt Controller ("I/O APIC") redirection table entry.

23. The method of claim 13, further comprising:
   generating a message indicating the first processor has been disabled.

24. The method of claim 23, further comprising:
   sending the message to a system administrator.

\* \* \* \* \*